Feb. 3, 1931. N. E. SAMPSON 1,790,951
APPARATUS FOR MANUFACTURING RAIL ANCHORS
Filed July 25, 1924 7 Sheets-Sheet 1
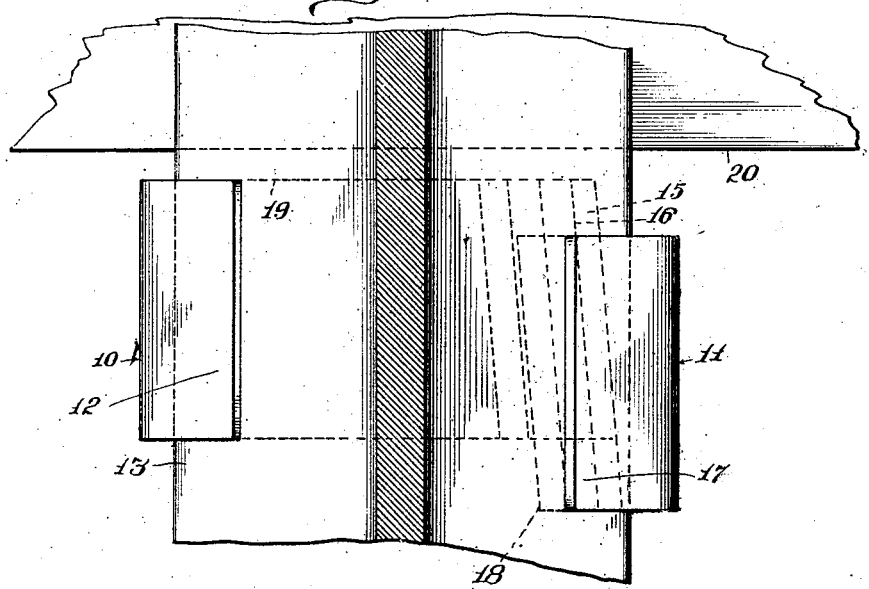
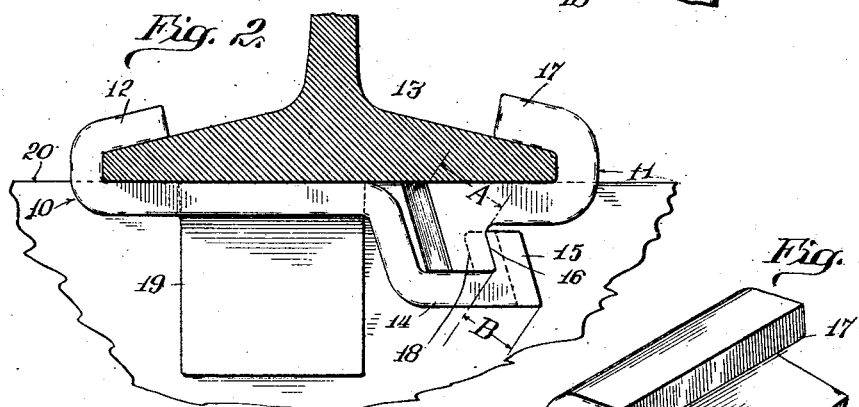
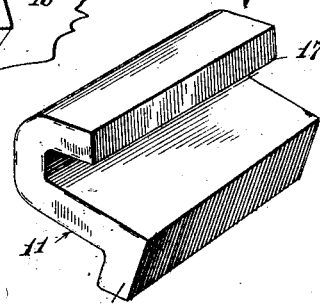
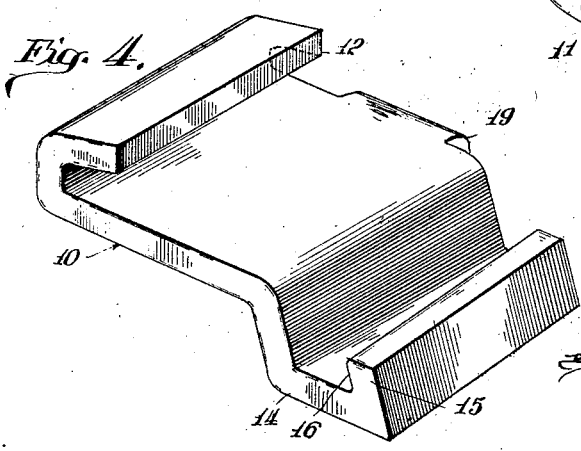
Inventor
Norman E. Sampson

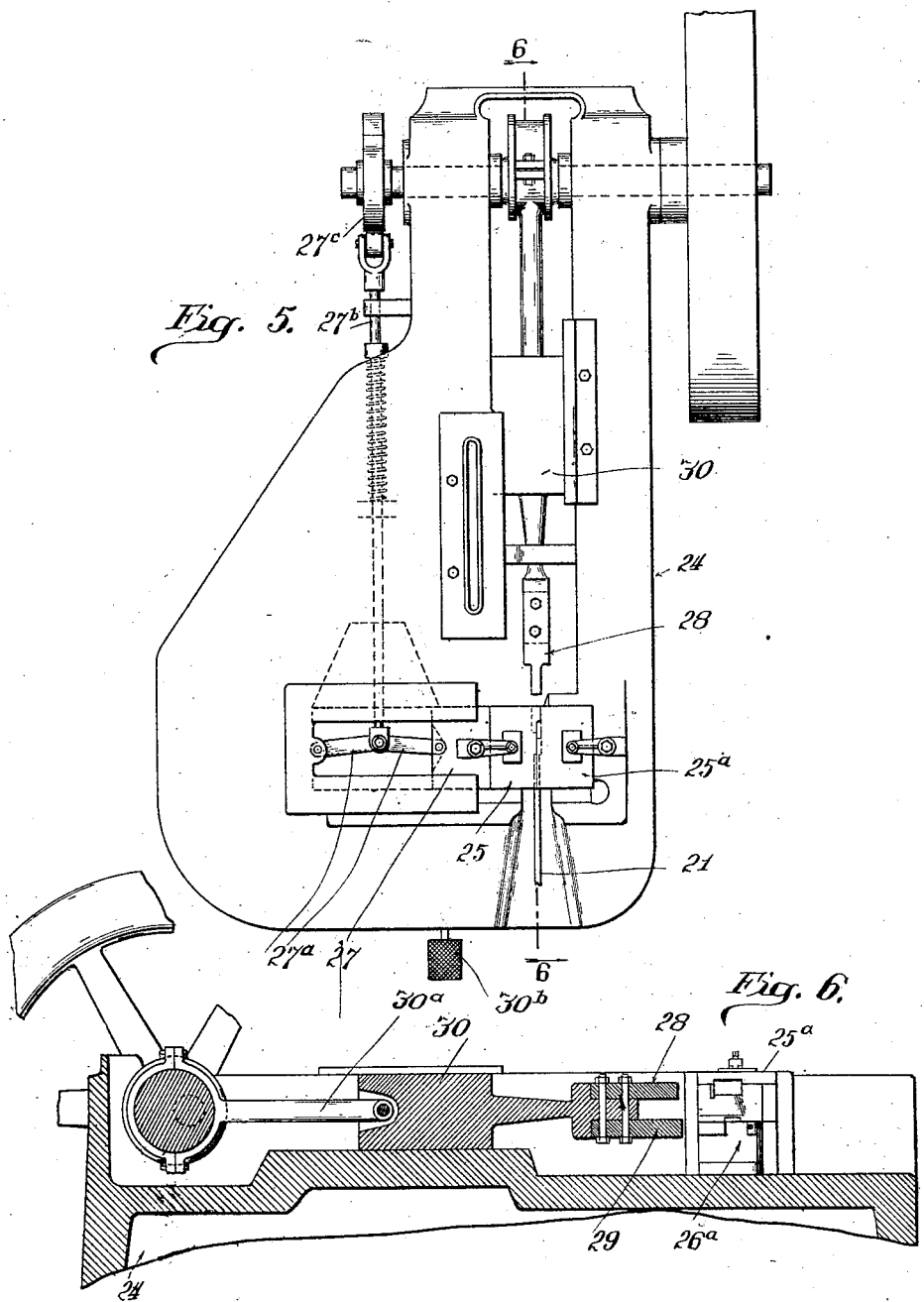

Feb. 3, 1931.  N. E. SAMPSON  1,790,951
APPARATUS FOR MANUFACTURING RAIL ANCHORS
Filed July 25, 1924    7 Sheets-Sheet 3
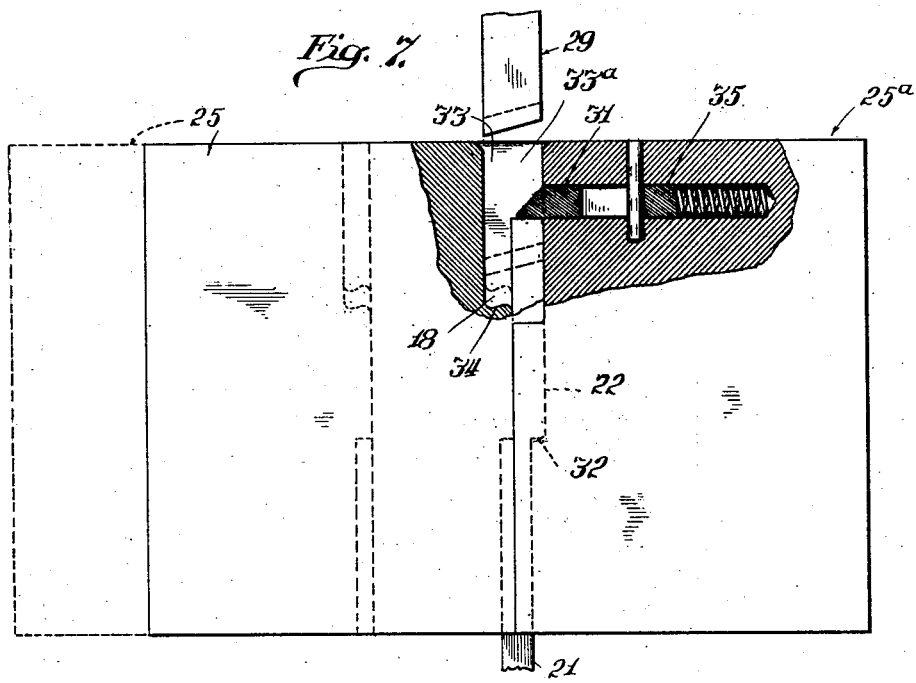
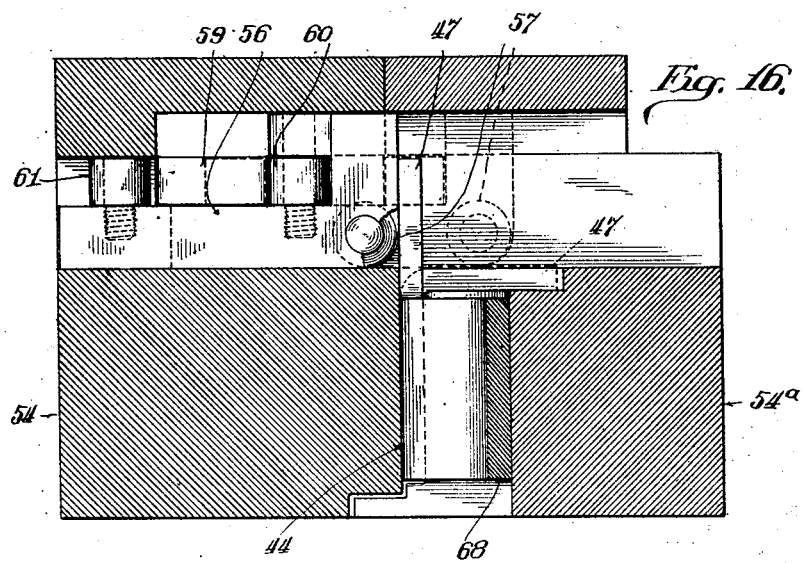
Inventor
Norman E. Sampson
By Barnett & Truman
Attorneys Feb. 3, 1931.  N. E. SAMPSON  1,790,951
APPARATUS FOR MANUFACTURING RAIL ANCHORS
Filed July 25, 1924   7 Sheets-Sheet 4
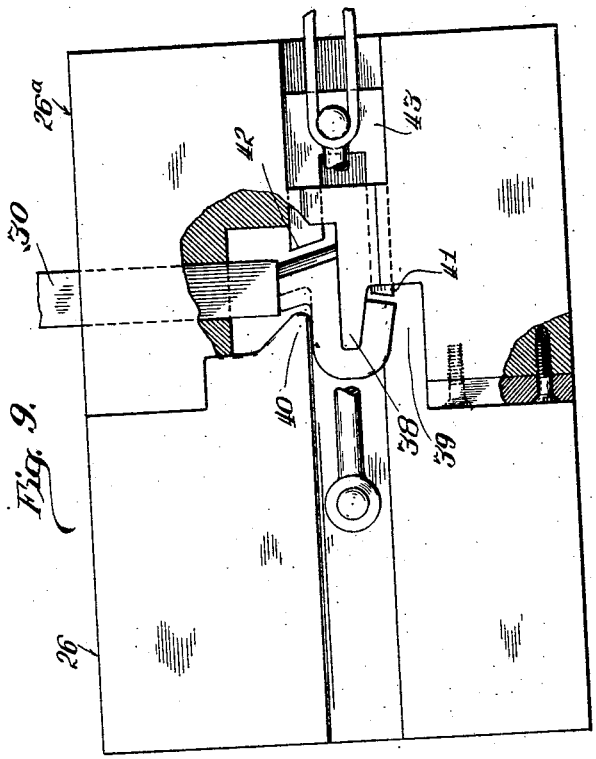
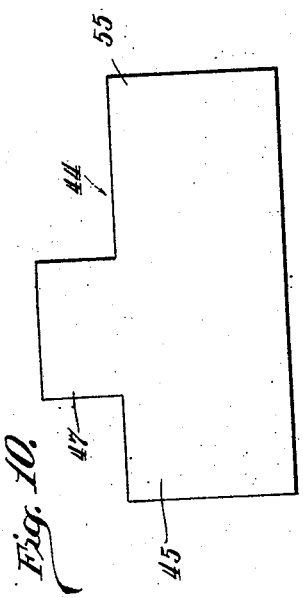
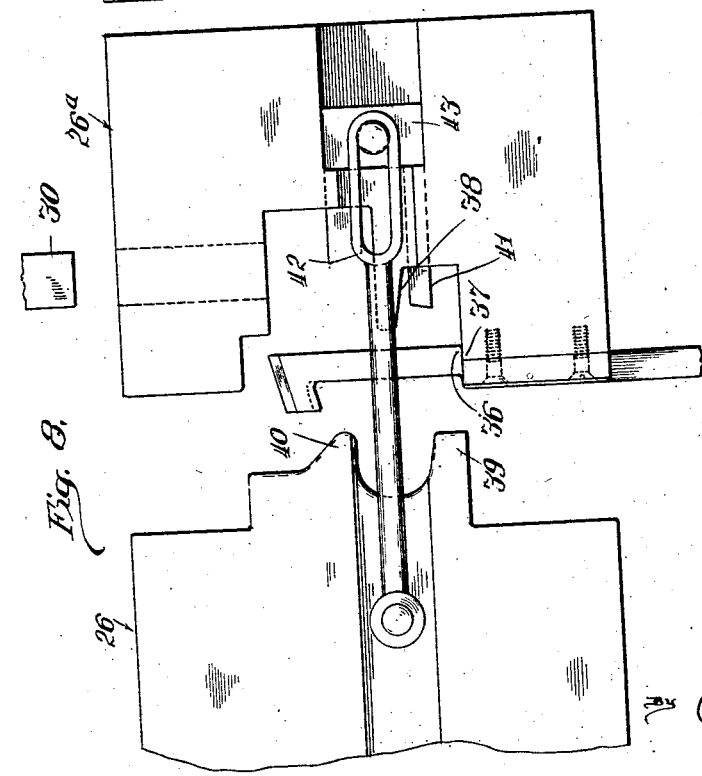
Inventor
Norman E. Sampson
By Barnett & Truman
Attorneys Feb. 3, 1931.  N. E. SAMPSON  1,790,951
APPARATUS FOR MANUFACTURING RAIL ANCHORS
Filed July 25, 1924   7 Sheets-Sheet 5
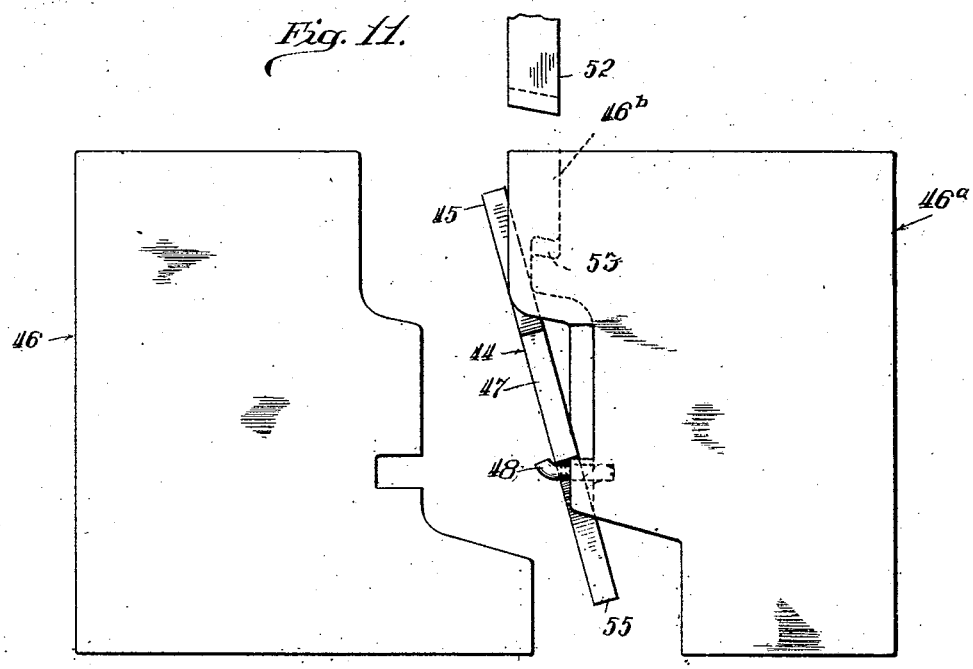
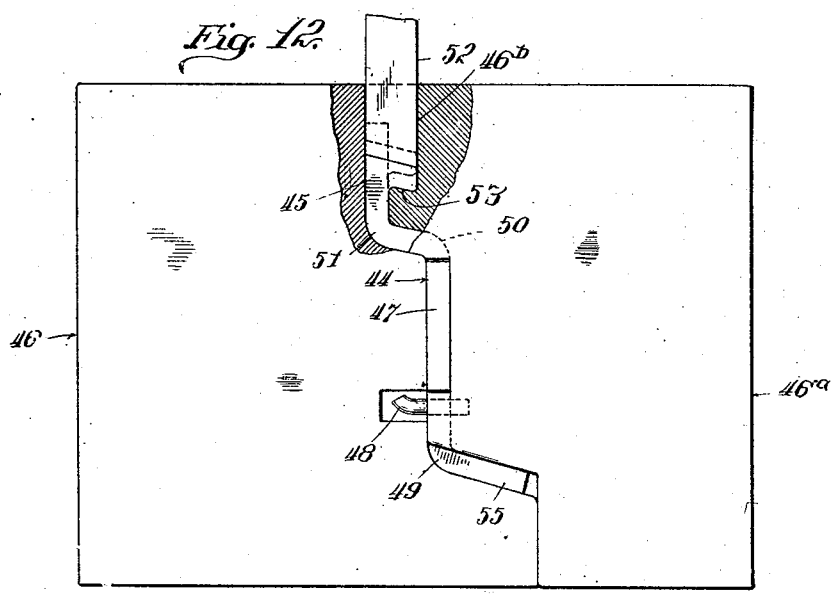
Inventor
Norman E. Sampson
By Barnett & Truman
Attorneys

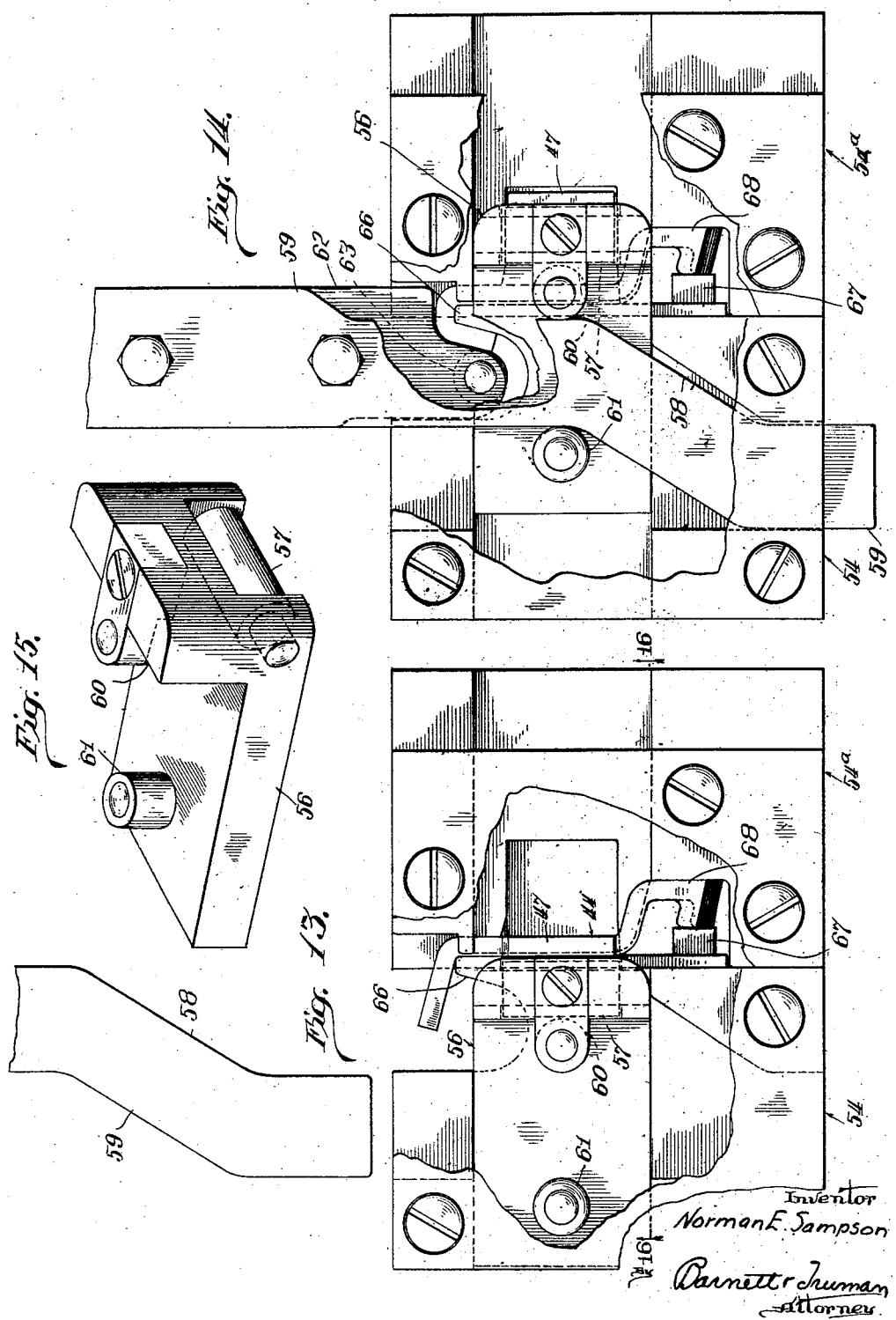

Feb. 3, 1931. N. E. SAMPSON 1,790,951
APPARATUS FOR MANUFACTURING RAIL ANCHORS
Filed July 25, 1924 7 Sheets-Sheet 7
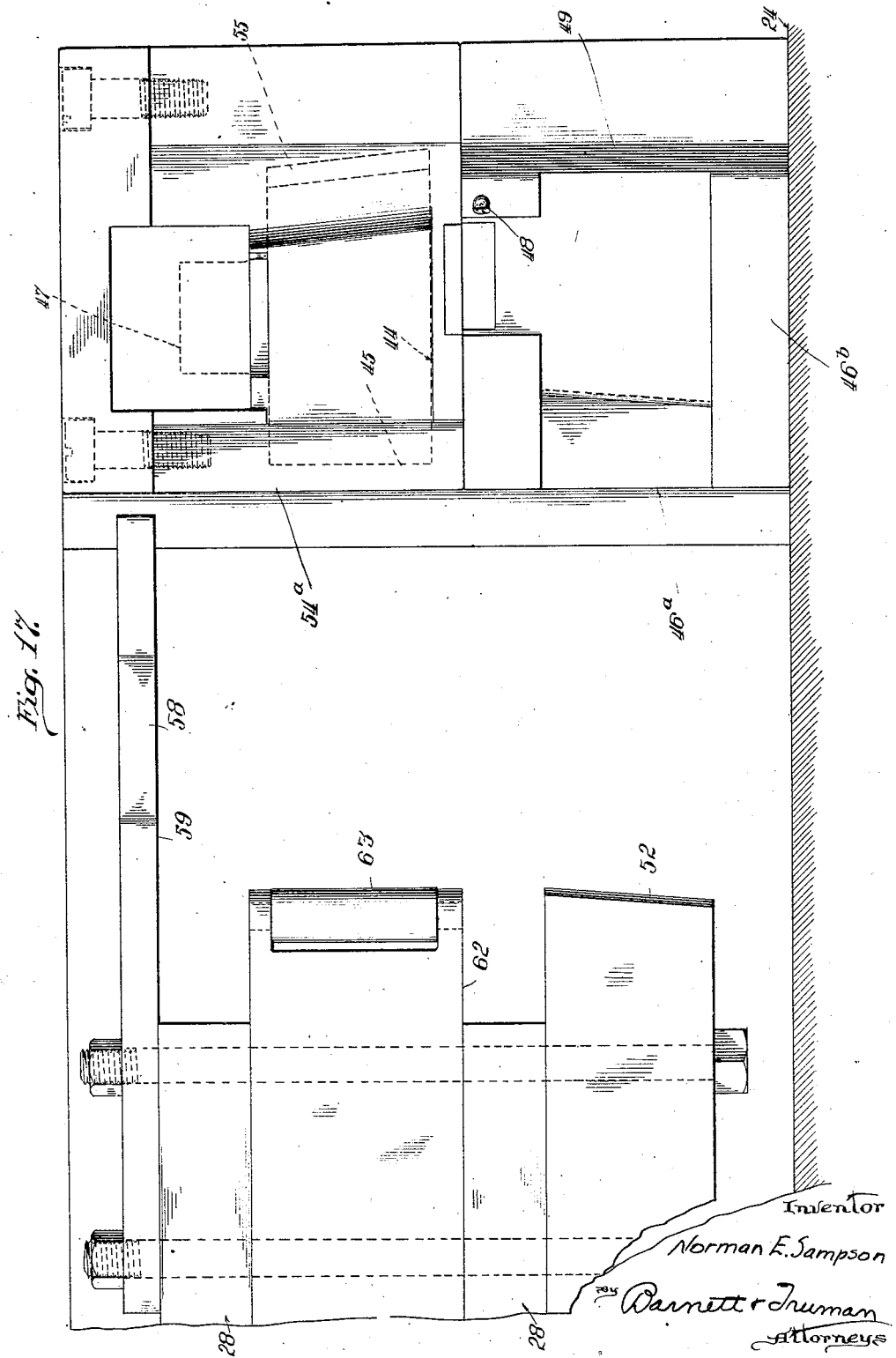

Patented Feb. 3, 1931

1,790,951

UNITED STATES PATENT OFFICE

NORMAN E. SAMPSON, OF CANTON, OHIO, ASSIGNOR TO CANTON FORGE & AXLE COMPANY, OF CANTON, OHIO, A CORPORATION OF DELAWARE

APPARATUS FOR MANUFACTURING RAIL ANCHORS

Application filed July 25, 1924. Serial No. 728,199.

My invention relates to apparatus for manufacturing rail anchors and has for its primary object the provision of an improved machine for manufacturing devices of this character whereby they may be expeditiously and economically manufactured by combined forging and bending operations.

A more specific object of the invention is to provide an apparatus for performing the various forging and bending operations in connection with the manufacture of rail anchors, the parts of which apparatus are of improved form and so arranged as to facilitate the work of the operator and so expedite the forming of the anchor members that forging and bending operations may be accomplished without reheating the blanks from which the anchor members are formed.

The invention has for further objects the provision of such other improvements in apparatus for manufacturing rail anchor devices as will be hereinafter described and claimed for carrying out the above stated objects and such other objects as will appear from the following description of the invention.

It will be apparent that various modifications in the structure of the machine may be made in the apparatus and that various departures may be made in the form of dies and pressing elements without departing from the invention as disclosed by my preferred embodiment as hereinafter described.

In the drawings

Fig. 1 is a plan view of a rail anchor shown herein for the purpose of illustrating one form of anchor which, by the use of my improved machine, can be made with a high degree of accuracy. The anchor is illustrated and applied to its operative position on a railroad rail.

Fig. 2 is a front view of the construction in Fig. 1.

Fig. 3 is a view, in perspective, of one of the members of the rail anchor.

Fig. 4 is a view, in perspective, of the other member of the anchor device.

Fig. 5 is a plan view of a machine constructed in accordance with my invention, and which is particularly suitable for use in connection with the manufacture of the form of anchor shown in Figs. 1 to 4, inclusive.

Fig. 6 is a section on line 6—6 of the apparatus shown in Fig. 5, showing the position of the die sections and the arrangement of the forging plungers.

Fig. 7 is a view of two die members in their normal operative position, showing certain steps in the manufacture of the rail anchor element shown in Fig. 3.

Fig. 8 is a view of the shearing and bending dies with the metal bar in position to be severed from the stock and bent to its completed form.

Fig. 9 is a view of the dies shown in Fig. 8 after they have been moved to the position to complete the bending operation.

Fig. 10 is a view in plan of a sheet metal blank from which the other element of the anchor (shown in Fig. 4) is formed.

Fig. 11 shows die elements with the blank shown in Fig. 11 placed in position to receive its initial bend.

Fig. 12 is a view of the die shown in Fig. 11 in their closed position and showing one end of the blank forged to its finished form.

Fig. 13 shows the dies and plunger mechanism for bending the other end of the anchor element to its finished form and for bending down a portion of the blank to form the tie abutting member of the anchor.

Fig. 14 is a view of the mechanism shown in Fig. 13 with the parts at the end of their operative stroke.

Fig. 15 is a view, in perspective, of a sliding member employed in this apparatus for bending over the tie abutting portion of the anchor, Fig. 16 is a section on line 16—16 of Fig. 13, and Fig. 17 is a diagrammatic side view of the arrangement of die section and plungers used in connection with the manufacture of the anchor element shown in Fig. 4.

In order that a clear understanding may be had of my invention, one form of rail anchor which may be made in the machine will first be described. The rail anchor illustrated is of a two-piece type, as shown in Figs. 1 to 4 inclusive, and consists of two jaw members 10 and 11 which interlock with each other and together embrace the base of a rail. The member 10 is formed at one end with a jaw 12 adapted to fit over one edge of the rail base 13 and at the other end with a channel shaped portion, the upstanding flange 15 of which inclines inwardly and is slightly oblique with respect to the jaw 12 so as to provide a wedge surface 16. The member 11 is formed with a jaw 17 adapted to fit over the other edge of the rail base and is provided with a downturned flange 18. The flange 18 is disposed at an angle corresponding to the angle of the flange 15 so that the flanges 15 and 18 will function as wedge members to force the jaws 12 and 17 into firm gripping engagement with the rail when the member 11 is driven to its operative position. The flange 18 is inclined from the vertical to correspond with the inclination of the flange 15 of the member 10 so as to provide an interlocking engagement which will prevent the channeled end 14 of the member 10 from moving downward. The member 10 is formed with a downward portion 19 adapted to bear against the cross tie 20.

The anchor is applied to the rail 13 by hooking the jaws of members 10 and 11 over opposite edges of the rail base. The member 11 is then moved longitudinally of the rail so as to bring its angularly disposed end 18 into interlocking engagement with the flange 15 of the other member. The member 11 may then be driven toward the tie 20 until the jaws grip the rail base and a tight fit of the interlocking flanges is effected.

In rail anchors of the above type heretofore made of sheet metal, the interlocking flanges (corresponding to flanges 15 and 18) have been formed by bending the edges of the blanks and therefore are confined in their strength to the thickness of the blanks from which the elements are formed. When this type of anchor is made in my machine, the interlocking flanges are formed, as will be hereinafter described, by forging operations so as to displace the metal of the blanks. This displacement of metal reinforces the parts of the anchor indicated in Fig. 2 by the reference characters A and B, thereby making it practical to use relatively thin blanks and at the same time provide sufficient strength to avoid distortion of said flanges when they are driven into wedging engagement. The displacement of the metal of the blank from which the member 11 is formed, in addition to strengthening the flange 18, provides a flat bearing surface at the end of the member for engaging the under surface of the rail, thereby providing a brace to resist any tendency of the flange 18 to bend or straighten out when the member is driven to its wedging position.

When manufacturing the member 11 of the rail anchor, a strip of metal or bar 21 of suitable thickness is heated at one end to a forging temperature and the desired length of the blank 22 is partly severed from the bar by means of a suitable die section. The partly severed blank is held firmly between said die sections and the end of the blank is upset to form the flange 18 of the finished member 11. The partly formed blank is then positioned between another set of die sections wherein the blank is severed from the bar and bent around an anvil portion of the die to form the jaw portions 16 of the member. After the blank is bent to its finished contour the flange 18 is subjected to pressure so as to insure that the end 23 thereof bears firmly against the anvil of the die.

In Figs. 5 and 6 I have shown my improved machine for performing the bending and forging operations above referred to. The particular form of plungers and die sections shown are intended for use in connection with the manufacture of an anchor of the type shown in Figs. 1 to 4 inclusive of the drawings. The machine illustrated consists of a base 24 on which two sets of die sections 25, 25$^a$, 26, 26$^a$ are supported, one above the other.

The die sections 25$^a$ and 26$^a$ are secured by suitable clamping mechanism to the base of the machine, and the die sections 25, 26 are clamped to a reciprocating head 27 so as to be opened and closed simultaneously by means of suitable link mechanism. The link mechanism illustrated preferably consists of toggle levers 27$^a$ connected to one end of a reciprocating rod 27$^b$. The rod 27$^b$ is actuated by means of cam 27$^c$ secured to the power shaft of the machine. The die sections are formed with openings, hereinafter specifically described, to receive plunger members adapted to perform the forging operations. The plungers used in connection with the manufacture of the anchor member 11 are shown in Fig. 6. These plungers are indicated by the reference numerals 28 and 29 and are secured one above the other to a single cross head 30. The cross head 30 may be operated by means of the eccentric rod 30$^a$ or other suitable connection with the power shaft of the machine. 30$^b$ designates the usual treadle clutch mechanism for controlling the operation of the machine.

The several positions of the die sections and plungers employed in connection with the manufacture of member 11 of the anchor are illustrated in Figs. 7, 8 and 9 of the drawings. The manufacture of the anchor member 11 is accomplished as follows: The bar 21 when heated, is inserted between the die sections 25, 25$^a$ (Fig. 7) and positioned against a gauge 31. The machine is operated to move die section 25 to its closed position and thereby partially severs the blank 22 by pressing the blank over the shoulder 32 of die section 25$^a$. While the partially severed blank is clamped between the die sections in the above position, the plunger 28 enters the recesses 33, 33ᵃ of the die sections, upsets the end of the blanks 22 and presses the upset portion against an undercut shoulder 34 on the die section 25 to form the angularly disposed flange 18 of the anchor. The gauge 31 may be withdrawn out of the path of the plunger by any suitable mechanism. For convenience of illustration, the gauge is shown as formed with a tapered end so that it will be forced within the recess 35 of the die section 25ᵃ when engaged by the plunger 28.

After the end of the blank is upset, as above described, the partially formed blank is positioned between the die sections 26, 26ᵃ (Fig. 8), the shoulder 36 of the blank, formed by the preceding operations, being held by the operator against the edge 37 of the die section 26ᵃ and serves as a gauge to insure the proper positioning of the blank between the said die sections 26, 26ᵃ. The machine is then operated to move die section 26 from the position shown in Fig. 8 to the position of Fig. 9. During this movement of the die section the blank is severed from the bar and is bent around the anvil portion 38 of the die section 26ᵃ by means of projections 39, 40 of the die section 26. The contour of the anvil 38 corresponds to the contour of the rail gripping surfaces of said anchor member. While the anchor member 11 is held on the anvil 38, the plunger 29 enters the recess of die section 26ᵃ and strikes the forged end of the anchor member so as to press it firmly against the anvil.

The finished member 11 is then removed from the anvil 38 by means of a knock off mechanism, consisting of fingers 41, 42 formed on slide 43, the latter of which has a lost motion link connection with the movable die section 26 so that the fingers will be pressed against the member 11 to remove it from the anvil when the die section 26 approaches its open position.

When manufacturing the member 10 of the anchor, die sections 46, 46ᵃ and 54, 54ᵃ are secured in place in the machine one above the other. The sections 54ᵃ and 46ᵃ are secured to the base of the machine and the sections 54 and 46 are secured to the movable head 27 in substantially the same manner as described in connection with the die sections employed in the manufacture of the member 11. The die sections 54 and 54ᵃ however are preferably arranged above the other sections. The plungers employed in connection with the manufacture of the member 10 are secured to the cross-head 30 of the machine, as shown in Fig. 17. The member 10, instead of being made from a metal strip, as shown in connection with the manufacture of the member 11, is made from a sheet metal blank 44 of the configuration shown in Fig. 10. The blank 44 is heated so that the end 45 will be at a forging temperature and the rest of the blank at a temperature suitable for bending. The blank is then positioned between the lower die sections 46, 46ᵃ, as shown in Fig. 11, with the portion 47 of the blank engaging a suitable gauge 48. The section 46 is then moved to its closed position, thereby forming the blank with bends 49, 50 and 51, as shown in Fig. 12. The blank is clamped in this position between the die section and the end 45 of the blank is upset, by means of a plunger 52. This plunger enters the recess 46ᵇ of the die section 46ᵃ and presses the upset portion against an undercut shoulder 53 of the die section 46ᵃ to form the upstanding flange 15 of the anchor member 10. The blank is then turned end for end and placed between the upper die sections 54, 54ᵃ wherein the portion 47 of the blank is bent over to form the tie abutting portion 19 of the anchor and the end 55 is bent to form the jaw portion 12 of the anchor. The bending of the portion 47 of the blank is effected by means of a slide 56 provided at one end with a roller 57 and actuated by means of an angularly disposed portion 58 of a plunger 59 adapted to operate between rollers 60 and 61 on the slide 56. As the portion 47 of the blank is bent down to the desired position, as shown in Fig. 16, a lower portion 62 of the plunger, provided with a roller 63, engages the end portion 55 of the blank and bends it around the anvil portion 66 of the die section 54. During these bending operations a projection 67 of the die section 54 bears firmly against the forged end portion 68 of the blank to prevent distortion of the blank during the bending operation above described.

It will be observed that by securing the plungers 52, 59 and 62 to the cross-head 30 of the machine and by securing the movable die sections to a single reciprocating head, a compact machine is provided, in which work may be performed simultaneously in both sets of die sections. This arrangement provides a compact and practical machine in which one complete member of the anchor may be formed with each working stroke of the plungers of the machine.

I claim:

A machine of the character described comprising a set of separable die sections adapted to receive a metal strip between them and formed with cooperating shearing edges for engaging said metal strip and with cooperating pressing faces, means for moving said sections together to grip said metal strip between them, one of said die sections being formed with an undercut shoulder, and a plunger for upsetting one end of the metal strip and for pressing the upset end thereof against said under-cut shoulder.

NORMAN E. SAMPSON.